(12) United States Patent
Nagata

(10) Patent No.: US 10,705,029 B2
(45) Date of Patent: Jul. 7, 2020

(54) INSPECTION APPARATUS AND INSPECTION METHOD

(71) Applicant: SCREEN HOLDINGS CO., LTD., Kyoto-shi, Kyoto (JP)

(72) Inventor: Yasushi Nagata, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 17 days.

(21) Appl. No.: 15/507,950

(22) PCT Filed: Apr. 28, 2015

(86) PCT No.: PCT/JP2015/062872
§ 371 (c)(1),
(2) Date: Mar. 1, 2017

(87) PCT Pub. No.: WO2016/035381
PCT Pub. Date: Mar. 10, 2016

(65) Prior Publication Data
US 2017/0307544 A1    Oct. 26, 2017

(30) Foreign Application Priority Data
Sep. 5, 2014  (JP) ................. 2014-181054

(51) Int. Cl.
*G01N 21/95*  (2006.01)
*G06T 7/00*   (2017.01)
(Continued)

(52) U.S. Cl.
CPC ............ *G01N 21/95* (2013.01); *G01N 21/88* (2013.01); *G01N 21/8806* (2013.01);
(Continued)

(58) Field of Classification Search
CPC ... G01N 2021/8816; G01N 2021/8867; G01N 2021/88; G01N 2021/8806;
(Continued)

(56) References Cited

U.S. PATENT DOCUMENTS 6,198,529 B1    3/2001  Clark, Jr. et al.
6,356,300 B1 *  3/2002  Shiba ............... G01N 21/95607
                                                        348/130
(Continued)

FOREIGN PATENT DOCUMENTS

CN    101762611 A    6/2010
CN    101887025 A    11/2010
(Continued)

OTHER PUBLICATIONS

Extended European Search Report issued in EP Patent Application No. 15838785.2, dated Apr. 10, 2018.
(Continued)

*Primary Examiner* — Mulugeta Mengesha
*Assistant Examiner* — Alazar Tilahun
(74) *Attorney, Agent, or Firm* — McDermott Will & Emery LLP

(57) ABSTRACT

In an inspection apparatus, light source parts for irradiating an object area on a surface of an object with light from directions, respectively, are provided, and a first picked-up image representing an object area is acquired in one image pickup part by light irradiation from one of the light source parts and a second picked-up image is acquired in the image pickup part by light irradiation from the light source parts. A first defect candidate area is detected by comparing the first picked-up image with a first reference image corresponding to the first picked-up image and a second defect candidate area is detected by comparing the second picked-up image with a second reference image corresponding to
(Continued)

the second picked-up image. An overlapping area in the first defect candidate area and the second defect candidate area is specified as a defect area in the object area.

14 Claims, 9 Drawing Sheets

(51) Int. Cl.
*G01N 21/88* (2006.01)
*G01N 21/956* (2006.01)

(52) U.S. Cl.
CPC ... *G01N 21/8851* (2013.01); *G01N 21/95607* (2013.01); *G01N 21/95684* (2013.01); *G06T 7/001* (2013.01); *G01N 2021/8816* (2013.01); *G01N 2021/8867* (2013.01); *G01N 2201/062* (2013.01); *G06T 2207/10152* (2013.01)

(58) Field of Classification Search
CPC ....... G01N 2021/8851; G01N 2021/95; G01N 2021/95607; G01N 2021/95684; G01N 2021/062; G01N 21/898; G01N 21/952; G01N 21/954; G01N 21/8422; G01N 21/956; G01N 21/95; G01N 21/8806; G01N 21/95684; G01N 21/95607; G01N 21/8851; G01N 21/88; G01N 2201/062; G01N 2021/8887; G06T 7/001; G06T 2207/10152
See application file for complete search history.

(56) References Cited

U.S. PATENT DOCUMENTS

| | | |
|---|---|---|
| 2006/0033922 A1 | 2/2006 | Sperling et al. |
| 2007/0211242 A1* | 9/2007 | Okabe ................ G01N 21/8806 356/237.2 |
| 2008/0049219 A1 | 2/2008 | Kim et al. |
| 2009/0116727 A1* | 5/2009 | Jin ..................... G01N 21/4738 382/149 |
| 2010/0188486 A1 | 7/2010 | Amanullah et al. |
| 2010/0188499 A1 | 7/2010 | Amanullah et al. |
| 2012/0236318 A1 | 9/2012 | Aoki |
| 2013/0044209 A1* | 2/2013 | Hwang ................ G01N 21/896 348/128 |
| 2014/0212021 A1 | 7/2014 | Amzaleg et al. |

FOREIGN PATENT DOCUMENTS

| | | |
|---|---|---|
| CN | 102822666 A | 12/2012 |
| CN | 104279456 A | 1/2015 |
| JP | 03-123808 A | 5/1991 |
| JP | 06-078856 U | 11/1994 |
| JP | H11-108637 A | 4/1999 |
| JP | 2005-017234 A | 1/2005 |
| JP | 2005-214720 A | 8/2005 |
| JP | 2008-164628 A | 7/2008 |
| JP | 2009-162573 A | 7/2009 |
| JP | 2010-139434 A | 6/2010 |
| TW | 201324645 A | 6/2013 |

OTHER PUBLICATIONS

Search Report issued in coresponding International Patent Application No. PCT/JP2015/062872, dated Jul. 7, 2015.
English Translation of International Preliminary Report on Patentability dated Mar. 7, 2017.

* cited by examiner

75

INSPECTION APPARATUS AND INSPECTION METHOD

CROSS REFERENCE

This application is the U.S. National Phase under 35 U.S.C. § 371 of International Application No. PCT/JP2015/062872, filed on Apr. 28, 2015, which claims the benefit of Japanese Application No. 2014-181054, filed on Sep. 5, 2014, the entire contents of each are hereby incorporated by reference.

TECHNICAL FIELD

The present invention relates to a technique for inspecting an appearance of an object having a satin-finished area on its surface.

BACKGROUND ART

Conventionally, apparatuses which pick up an image of a three-dimensional object by irradiating the object with light and inspect an appearance of the object on the basis of the picked-up image have been used. In an appearance inspection apparatus disclosed in Japanese Patent Application Laid-Open No. 2005-17234, for example, in order to inspect an appearance of a dome-shaped solder on an electronic circuit board, a first image is acquired in a state where the dome-shaped solder is irradiated with parallel rays of light from both left and right sides thereof and a second image is acquired in a state where the dome-shaped solder is irradiated with parallel rays of light from front and back sides thereof. Then, a composite image which is represented by absolute values of differences between first image data and second image data is obtained, and when strip-like shades are present radially on the composite image, a mounting failure of a chip component on the dome-shaped solder is detected.

Further, in a shape recognition apparatus disclosed in Japanese Patent Application Laid-Open No. 2009-162573, a camera for picking up images of an object to be inspected and a lighting part rotating about the camera are provided, and images of the object to be inspected are sequentially picked up with lighting angles of the lighting part being changed. In the shape recognition apparatus, since a shadow of a projection (defective shape) on the object to be inspected is changed as the lighting angle is changed, the shape of the projection can be estimated.

On the other hand, in a metal component (e.g., automobile component) formed by forging and/or casting, a surface treatment such as shot blasting and/or the like is performed thereon and a surface of the component thereby has a satin-finished three-dimensional structure with microscopic projections and depressions thereon. In an appearance inspection on such metal components, defects such as dents, flaws, and the like on surfaces of the objects are detected by visual inspection of operators.

In such an inspection of the objects by operators as above, even if an inspection standard is determined, there are disadvantageously variations in the accuracy of the inspection among the operators. Further, there is a possibility that defects of the objects may be overlooked by human error. In the case where defects are detected on the basis of the picked-up images of the objects, since the light entering the satin-finished surfaces is reflected diffusely, variations in the tone value of the picked-up image (local changes in the density) increase and therefore a number of false defects are disadvantageously detected.

SUMMARY OF INVENTION

The present invention is intended for an inspection apparatus for inspecting an appearance of an object having a satin-finished area on its surface, and it is an object of the present invention to detect a defect on the satin-finished surface of the object with high accuracy.

The inspection apparatus according to the present invention includes: a first lighting part for irradiating a predetermined object area on a surface of an object with light from only one direction; a second lighting part for irradiating the object area with light from a plurality of directions; an image pickup part for picking up an image of the object area; a defect candidate detection part for detecting an area of a defect candidate in the object area as a first defect candidate area by comparing a first picked-up image acquired in the image pickup part by light irradiation from the first lighting part, with a first reference image corresponding to the first picked-up image, and detecting an area of a defect candidate in the object area as a second defect candidate area by comparing a second picked-up image acquired in the image pickup part by light irradiation from the second lighting part, with a second reference image corresponding to the second picked-up image; and a defect specifying part for specifying an overlapping area in the first defect candidate area and the second defect candidate area as a defect area in the object area.

By the present invention, it is possible to detect a defect on the satin-finished surface of the object with high accuracy.

In one preferred embodiment of the present invention, the second lighting part has a plurality of light source parts for irradiating the object area with light from a plurality of directions, respectively, and one of the plurality of light source parts is the first lighting part.

In this case, preferably, the inspection apparatus further includes a control part sequentially using each of the plurality of light source parts as the first lighting part, to cause the image pickup part to acquire a plurality of first picked-up images, and in the inspection apparatus, the defect candidate detection part compares the plurality of first picked-up images with a plurality of first reference images corresponding to the plurality of first picked-up images, respectively, to generate a plurality of first defect candidate images each representing a first defect candidate area, and the defect specifying part specifies an overlapping area in the first defect candidate area represented by each first defect candidate image and the second defect candidate area, as a defect area in the object area. More preferably, the number of the plurality of light source parts is not less than 3.

The present invention is also intended for an inspection method of inspecting an appearance of an object having a satin-finished area on its surface. The inspection method according to the present invention includes: a) acquiring a first picked-up image by an image pickup part which picks up an image of a predetermined object area on a surface of an object while irradiating the object area with light from only one direction by a first lighting part; b) acquiring a second picked-up image by the image pickup part while irradiating the object area with light from a plurality of directions by a second lighting part; c) detecting an area of a defect candidate in the object area as a first defect candidate area by comparing the first picked-up image with a first reference image corresponding to the first picked-up image; d) detecting an area of a defect candidate in the object area as a second defect candidate area by comparing the second picked-up image with a second reference image corresponding to the second picked-up image; and e) specifying an overlapping area in the first defect candidate area and the second defect candidate area as a defect area in the object area.

These and other objects, features, aspects and advantages of the present invention will become more apparent from the following detailed description of the present invention when taken in conjunction with the accompanying drawings.

DESCRIPTION OF EMBODIMENTS

Figure 1:
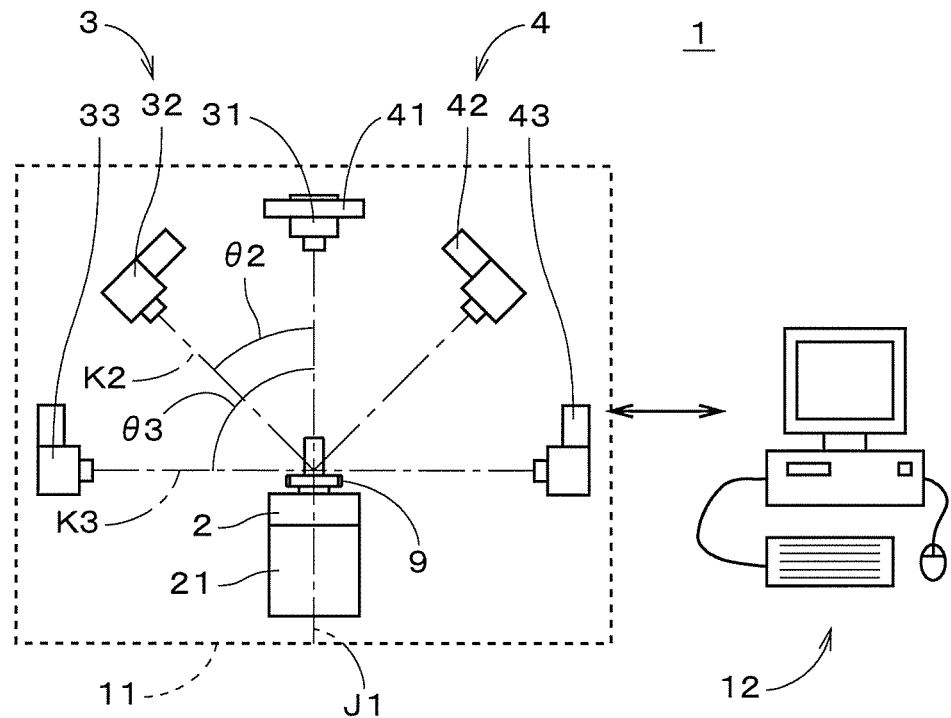
FIG. 1 is a view showing a configuration of an inspection apparatus.
Figure 2:
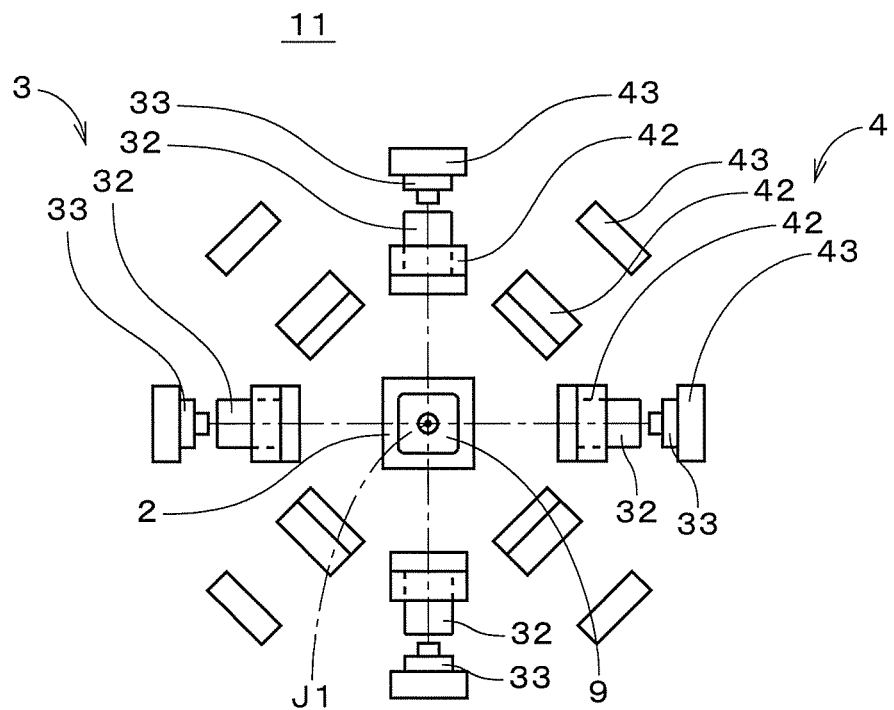
FIG. 2 is a plan view showing a main body of the inspection apparatus.

FIG. 1 is a view showing a configuration of an inspection apparatus 1 in accordance with one preferred embodiment of the present invention. FIG. 2 is a plan view showing a main body 11 of the inspection apparatus 1. The inspection apparatus 1 is an apparatus for inspecting an appearance of a three-dimensional object 9 having a gloss on its surface. The object 9 is, for example, a metal component formed by forging and/or casting, and has a satin-finished surface with microscopic projections and depressions thereon. The object 9 is, for example, one of various components (a shaft, an outer ring, a yoke, and the like of a cylindrical hub) used for universal joint.

As shown in FIG. 1, the inspection apparatus 1 includes a main body 11 and a computer 12. The main body 11 includes a stage 2, a stage rotation part 21, an image pickup unit 3, and a light source unit 4. The object 9 is placed on the stage 2. The stage rotation part 21 rotates the object 9 together with the stage 2 about a central axis J1 oriented in a vertical direction at a predetermined angle. The central axis J1 goes through the center of the stage 2. The main body 11 is provided with a light shielding cover (not shown) which prevents external light from arriving on the stage 2, and the stage 2, the image pickup unit 3, and the light source unit 4 are provided within the light shielding cover.

As shown in FIGS. 1 and 2, the image pickup unit 3 includes one upper image pickup part 31, four oblique image pickup parts 32, and four side image pickup parts 33. In FIG. 2, the upper image pickup part 31 is not shown (an upper light source part 41 described later is also not shown). The upper image pickup part 31 is disposed above the stage 2 on the central axis J1. By using the upper image pickup part 31, it is possible to acquire an image of the object 9 on the stage 2, which is picked up from directly above.

As shown in FIG. 2, when the main body 11 is viewed from above with a downward line of sight (in other words, when the main body 11 is planarly viewed), the four oblique image pickup parts 32 are arranged around the stage 2. The four oblique image pickup parts 32 are arranged circumferentially about the central axis J1 at an angular interval (pitch) of 90 degrees. In a plane including an imaging optical axis K2 of each oblique image pickup part 32 and the central axis J1 (see FIG. 1), an angle θ2 between the imaging optical axis K2 and the central axis J1 is about 45 degrees. By using each of the oblique image pickup parts 32, it is possible to acquire an image of the object 9 on the stage 2, which is picked up from diagonally upward.

When the main body 11 is planarly viewed, the four side image pickup parts 33 are also arranged around the stage 2 as with the four oblique image pickup parts 32. The four side image pickup parts 33 are arranged circumferentially at an angular interval of 90 degrees. In a plane including an imaging optical axis K3 of each side image pickup part 33 and the central axis J1, an angle θ3 between the imaging optical axis K3 and the central axis J1 is about 90 degrees. By using each of the side image pickup parts 33, it is possible to acquire an image of the object 9 on the stage 2, which is picked up from a side. The upper image pickup part 31, the oblique image pickup part 32, and the side image pickup part 33 each have, for example, a CCD (Charge Coupled Device), a CMOS (Complementary Metal-Oxide Semiconductor), or the like, and can acquire multi-gradation images. The upper image pickup part 31, the oblique image pickup parts 32, and the side image pickup parts 33 are supported by a supporting part (not shown).

The light source unit 4 includes one upper light source part 41, eight oblique light source parts 42, and eight side light source parts 43. The upper light source part 41 is a light source part in which a plurality of LEDs (light emitting diodes) are arranged like a ring around the central axis J1. The ring-like upper light source part 41 is so fixed to the upper image pickup part 31 as to surround the circumference of the upper image pickup part 31. By using the upper light source part 41, it is possible to irradiate the object 9 on the stage 2 with light along a direction parallel with the central axis J1 from directly above.

When the main body 1 is planarly viewed, the eight oblique light source parts 42 are arranged around the stage 2. The eight oblique light source parts 42 are arranged circumferentially at an angular interval of 45 degrees. Each of the oblique light source parts 42 is a light source part in which a plurality of LEDs are arranged like a bar extending in a direction of tangent of a circumference about the central axis J1. Assuming that a line connecting a center of a light outgoing surface of each oblique light source part 42 and (a center of) the object 9 is termed "lighting axis", in a plane including the lighting axis of the oblique light source part 42 and the central axis J1, an angle between the lighting axis and the central axis J1 is about 45 degrees. By using each oblique light source part 42, it is possible to irradiate the object 9 on the stage 2 with light along the lighting axis from diagonally upward. In the inspection apparatus 1, out of the eight oblique light source parts 42, four oblique light source parts 42 are fixed to the four oblique image pickup parts 32, respectively, and the remaining four oblique light source parts 42 are supported by the not-shown supporting part.

When the main body 1 is planarly viewed, the eight side light source parts 43 are arranged around the stage 2. The eight side light source parts 43 are arranged circumferentially at an angular interval of 45 degrees. Each of the side light source parts 43 is a light source part in which a plurality of LEDs are arranged like a bar extending in a direction of tangent of a circumference about the central axis J1. Assuming that a line connecting a center of a light outgoing surface of each side light source part 43 and the object 9 is termed "lighting axis" like in the case of the oblique light source part 42, in a plane including the lighting axis of the side light source part 43 and the central axis J1, an angle between the lighting axis and the central axis J1 is about 90 degrees. By using each side light source part 43, it is possible to irradiate the object 9 on the stage 2 with light along the lighting axis from a side. In the inspection apparatus 1, out of the eight side light source parts 43, four side light source parts 43 are fixed to the four side image pickup parts 33, respectively, and the remaining four side light source parts 43 are supported by the not-shown supporting part.

For example, a distance between the object 9, and the upper image pickup part 31 and the upper light source part 41 is about 55 cm (centimeters). Further, a distance between the object 9, and the oblique image pickup part 32 and the oblique light source part 42 is about 50 cm, and a distance between the object 9, and the side image pickup part 33 and the side light source part 43 is about 40 cm. In the upper light source part 41, the oblique light source parts 42, and the side light source parts 43, some types of light sources other than the LED may be used.

Figure 3:
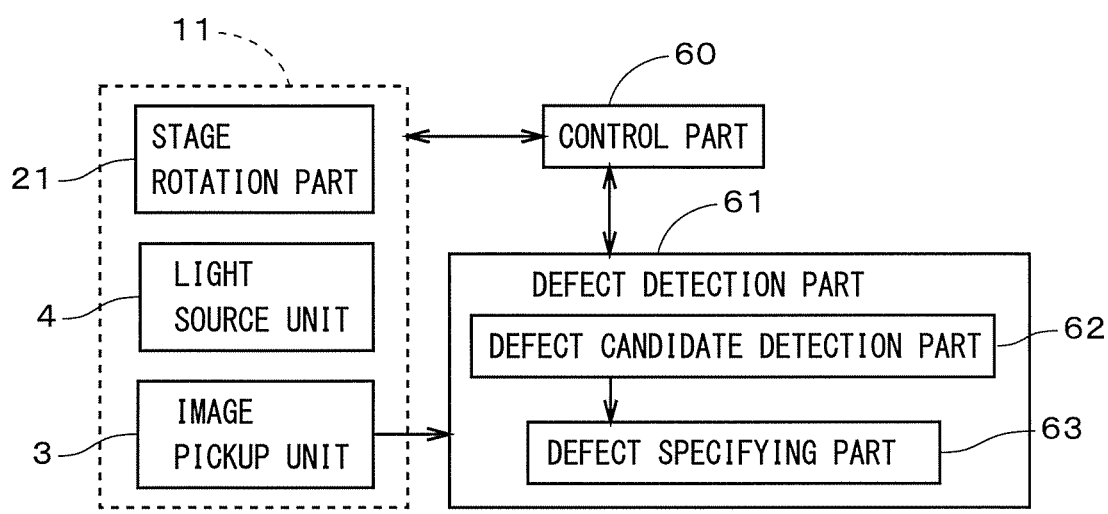
FIG. 3 is a block diagram showing a functional constitution implemented by a computer.

FIG. 3 is a block diagram showing a functional constitution implemented by the computer 12. FIG. 3 also shows the constitution of the main body 11 (the stage rotation part 21, the image pickup unit 3, and the light source unit 4) by using blocks. The computer 12 includes a control part 60 and a defect detection part 61. The control part 60 performs general control of the inspection apparatus 1. The defect detection part 61 includes a defect candidate detection part 62 and a defect specifying part 63. The defect candidate detection part 62 detects a defect candidate area on the basis of picked-up images acquired by the image pickup unit 3. The defect specifying part 63 specifies a defect area indicating a true defect out of the defect candidate areas. Detailed description of the defect candidate detection part 62 and the defect specifying part 63 will be made later.

Figure 4:
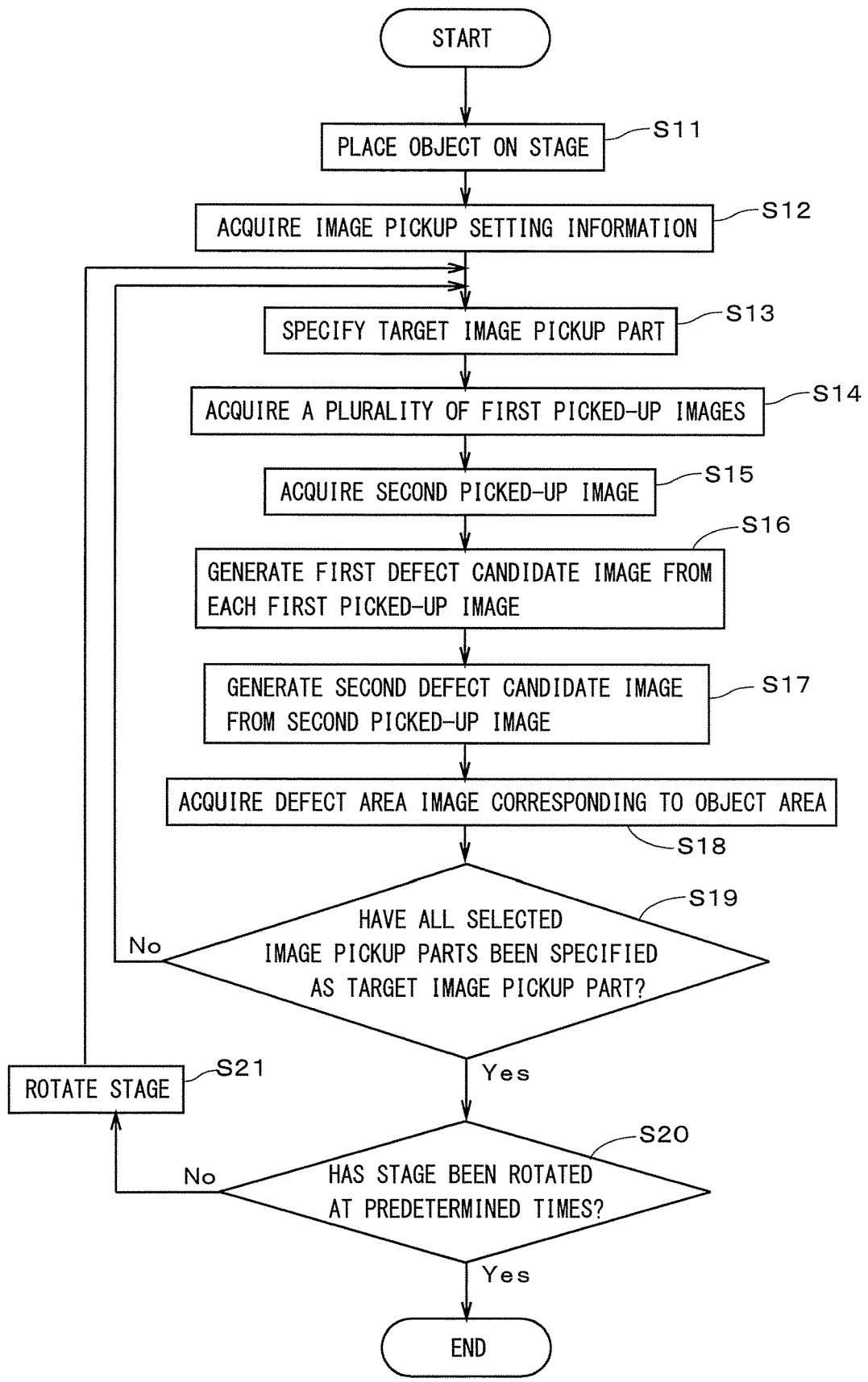
FIG. 4 is a flowchart showing an operation flow of an inspection on an object.

FIG. 4 is a flowchart showing an operation flow of an inspection performed on the object 9 by the inspection apparatus 1. First, the object 9 to be inspected is placed on the stage 2 (Step S11). On the stage 2, provided are, for example, a plurality of pins for alignment, and by bringing predetermined portions of the object 9 into contact with the plurality of pins, the object 9 is disposed on a predetermined position of the stage 2 in a predetermined orientation. Subsequently, the control part 60 acquires image pickup setting information for the object 9 on the stage 2 on the basis of an input or the like by an operator (Step S12). Herein, the image pickup setting information indicates an image pickup part (hereinafter, also referred to as a "selected image pickup part") to be used in the image pickup unit 3 and a light source part to be lighted in the light source unit 4 when the selected image pickup part acquires a picked-up image.

In the present exemplary process, the image pickup setting information indicates that the four oblique image pickup parts 32 in the image pickup unit 3 are to be used as the selected image pickup parts. Further, the image pickup setting information instructs each of the oblique image pickup parts 32 which are the selected image pickup parts to acquire images with each of the oblique light source part 42 which is placed at the same position as that of the oblique image pickup part 32, two oblique light source parts 42 adjacent clockwise to the above oblique light source part 42, and other two oblique light source parts 42 adjacent counterclockwise to the above oblique light source part 42 (hereinafter, these oblique light source parts 42 are referred to as a "specific light source part group") being lighted and to acquire images with all the oblique light source parts included in the specific light source part group being lighted. When the main body 11 is viewed from above with a downward line of sight, the lighting axes of the five oblique light source parts 42 included in the specific light source part group corresponding to each oblique image pickup part 32 are inclined with respect to the imaging optical axis K2 of the oblique image pickup part 32 by −90 degrees, −45 degrees, 0 degrees, +45 degrees, and +90 degrees, respectively. In other words, the five oblique light source parts 42 are placed circumferentially about the central axis J1 at the angular positions of −90 degrees, −45 degrees, 0 degrees, +45 degrees, and +90 degrees with respect to the oblique image pickup part 32, respectively.

After the image pickup setting information for the object 9 is acquired, one of the plurality of oblique image pickup parts 32 which are the selected image pickup parts is specified as a target image pickup part (Step S13). Subsequently, a picked-up image is acquired by the target image pickup part 32 while only one oblique light source part 42 among the specific light source part group for the target image pickup part 32 is lighted. At that time, with an area on the surface of the object 9, which almost faces the target image pickup part 32, defined as an "object area", the oblique light source part 42 irradiates the object area with light along the lighting axis thereof. Thus, the target image pickup part 32 picks up an image of the object area while one of the oblique light source parts 42 included in the specific light source part group irradiates the object area with light from only one direction. In the following description, the picked-up image acquired in the target image pickup part by the light irradiation from only one light source part is referred to as a "first picked-up image", and the light source part which irradiates the object area with light in order to acquire the first picked-up image is referred to as a "first lighting part". In the first picked-up image acquired by the light irradiation from only one direction, it is likely to cause shadows to appear due to the microscopic projections and depressions on the object area.

In the inspection apparatus 1, by the control of the control part 60, by sequentially using each of the plurality of oblique light source parts 42 included in the specific light source part group as the first lighting part, a plurality of first picked-up images are acquired in the target image pickup part 32 (Step S14). As described earlier, the specific light source part group includes the oblique light source parts 42 arranged at the angular positions of −90 degrees, −45 degrees, 0 degrees, +45 degrees, and +90 degrees with respect to the target image pickup part 32, respectively. Assuming that the first picked-up image acquired by using the light source part placed at the angular position of N degrees with respect to the target image pickup part as the first lighting part is referred to as a "first picked-up image by lighting at N degrees", in Step S14, the first picked-up image by lighting at −90 degrees, the first picked-up image by lighting at −45 degrees, the first picked-up image by lighting at 0 degrees, the first picked-up image by lighting at +45 degrees, and the first picked-up image by lighting at +90 degrees are acquired. The plurality of oblique light source parts 42 included in the specific light source part group can be regarded as a plurality of first lighting parts used for acquiring the plurality of first picked-up images. Further, each of the oblique light source parts 42 included in the specific light source part group does not necessarily irradiate the entire object area with light, but the oblique light source part 42 placed at the angular position of −90 degrees irradiates about half of the object area with light. The light source part used as the first lighting part only has to irradiate each part of the object area, which can be irradiated with light, with light from only one direction.

Subsequently, a picked-up image is acquired by the target image pickup part 32 while all the oblique light source parts 42 included in the specific light source part group for the target image pickup part 32 are lighted (Step S15). At that time, the plurality of oblique light source parts 42 placed at the angular positions of −90 degrees, −45 degrees, 0 degrees, +45 degrees, and +90 degrees with respect to the target image pickup part 32 irradiate the object area with light along the lighting axes thereof. Thus, the target image pickup part 32 picks up an image of the object area while the plurality of oblique light source parts 42 irradiate the object area with light from a plurality of different directions. In the following description, the picked-up image acquired in the target image pickup part by the light irradiation from all the light source parts included in the specific light source part group is referred to as a "second picked-up image", and a set of all the light source parts which irradiate the object 9 with light in order to acquire the second picked-up image is referred to as a "second lighting part".

As described earlier, though each of the oblique light source parts 42 included in the specific light source part group does not necessarily irradiate the entire object area with light, the second lighting part irradiates each part of the object area with light from at least two oblique light source parts 42, i.e., from at least two directions. In the present exemplary process, each part of the object area is irradiated with light from at least three oblique light source parts 42. In the second picked-up image acquired by the light irradiation from a plurality of directions, it is unlikely to cause shadows to appear due to the microscopic projections and depressions on the object area. In the inspection apparatus 1, respective intensities of light emitted from the plurality of oblique light source parts 42 included in the specific light source part group are almost equal to one another. Further, the intensity of light emitted from each oblique light source part 42 in order to acquire the second picked-up image is lower than that of light emitted from the oblique light source part 42 in order to acquire the first picked-up image.

Figure 5:
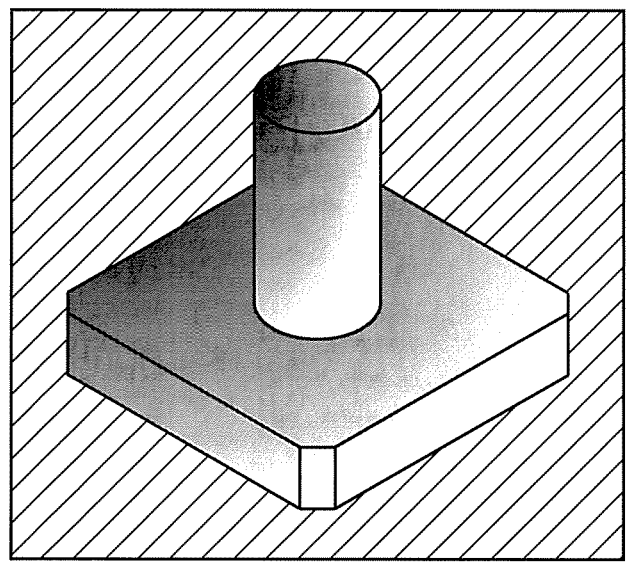
FIG. 5 is a view showing a first picked-up image.
Figure 6:
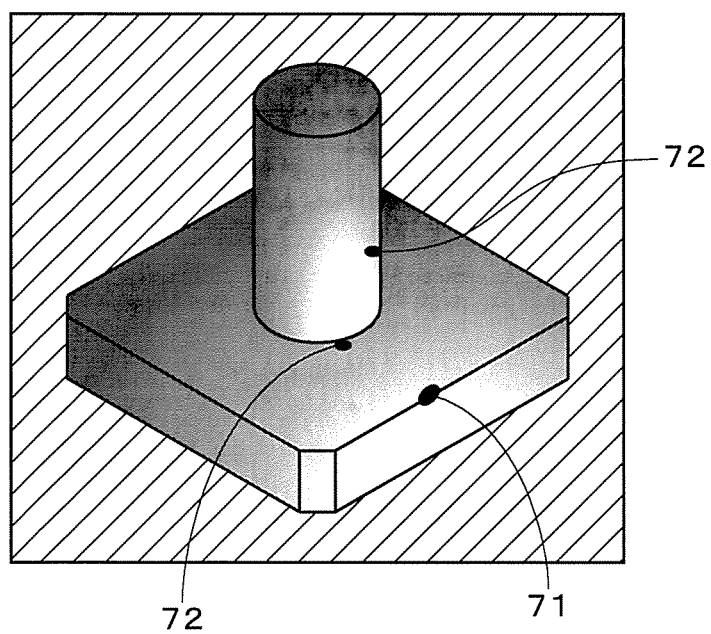
FIG. 6 is another view showing a first picked-up image.
Figure 7:
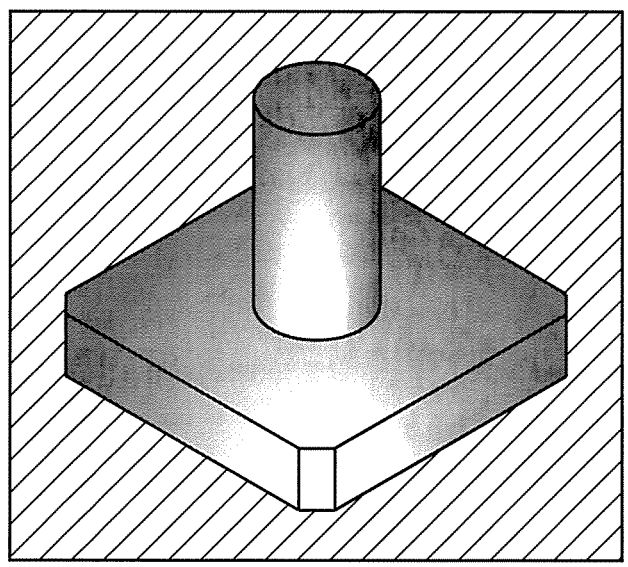
FIG. 7 is still another view showing a first picked-up image.
Figure 8:
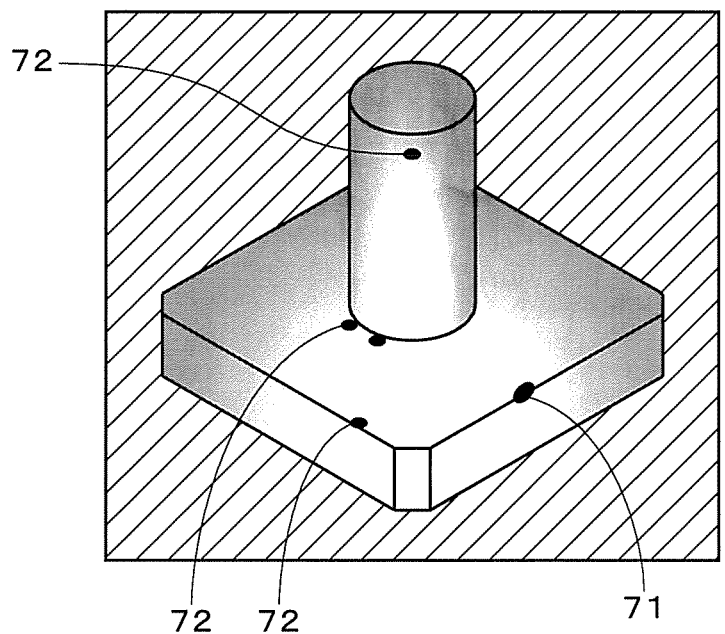
FIG. 8 is a view showing a second picked-up image.

FIGS. 5 to 7 are views each showing an exemplary first picked-up image. FIG. 5 shows the first picked-up image by lighting at −90 degrees, FIG. 6 shows the first picked-up image by lighting at −45 degrees, and FIG. 7 shows the first picked-up image by lighting at 0 degrees. FIG. 8 is a view showing an exemplary second picked-up image. As described above, the second picked-up image is acquired by the light irradiation from the second lighting part, i.e., by all lightings at −90 degrees, −45 degrees, 0 degrees, +45 degrees, and +90 degrees. In FIGS. 5 to 8, an area representing a background of the object 9 is hatched.

Herein, in the picked-up image, in a defect area indicating a depression or projection defect (for example, a depression or projection defect which is sufficiently larger than the microscopic projection or depression on the satin-finished surface) on the object area, normally, the difference in brightness from a surrounding area increases due to the light emitted from a direction. Further, depending on the shape of the defect (an angle of the depression, or the like), the difference in brightness between the defect area and the surrounding area, which is caused by the light emitted from another direction, is small. In the examples shown in FIGS. 5 to 8, the defect area becomes distinguishably bright against the surrounding area by lighting at −45 degrees, and the defect area is hardly distinguishable by lighting from other directions. Therefore, in the first picked-up image of FIG. 6 by lighting at −45 degrees and the second picked-up image of FIG. 8 by all lightings at −90 degrees, −45 degrees, 0 degrees, +45 degrees, and +90 degrees, the defect area (hereinafter, referred to as a "true defect area", for distinction from a false defect area described later) becomes distinguishably bright against the surrounding area. Further, in a plurality of first picked-up images and the second picked-up image, there is an area having a brightness different from that of the surrounding area, which is due to the satin-finished surface of the object area, i.e., a false defect area. Since the second picked-up image has a lighting state different from that of the first picked-up image, a position in the second picked-up image where the false defect area occurs is different from that in the first picked-up image.

In the first picked-up image of FIG. 6 and the second picked-up image of FIG. 8, the true defect area 71 and the false defect area 72 are filled in black. Actually, it is impossible to distinguish between the true defect area and the false defect area at this stage. As a matter of course, also in other first picked-up images, some false defect areas 72 can occur. The plurality of first picked-up images acquired by lighting of the oblique light source parts 42 included in the specific light source part group and the second picked-up image acquired by lightings of all the oblique light source parts 42 included in the specific light source part group are inputted to the defect candidate detection part 62 of the defect detection part 61.

Figure 9:
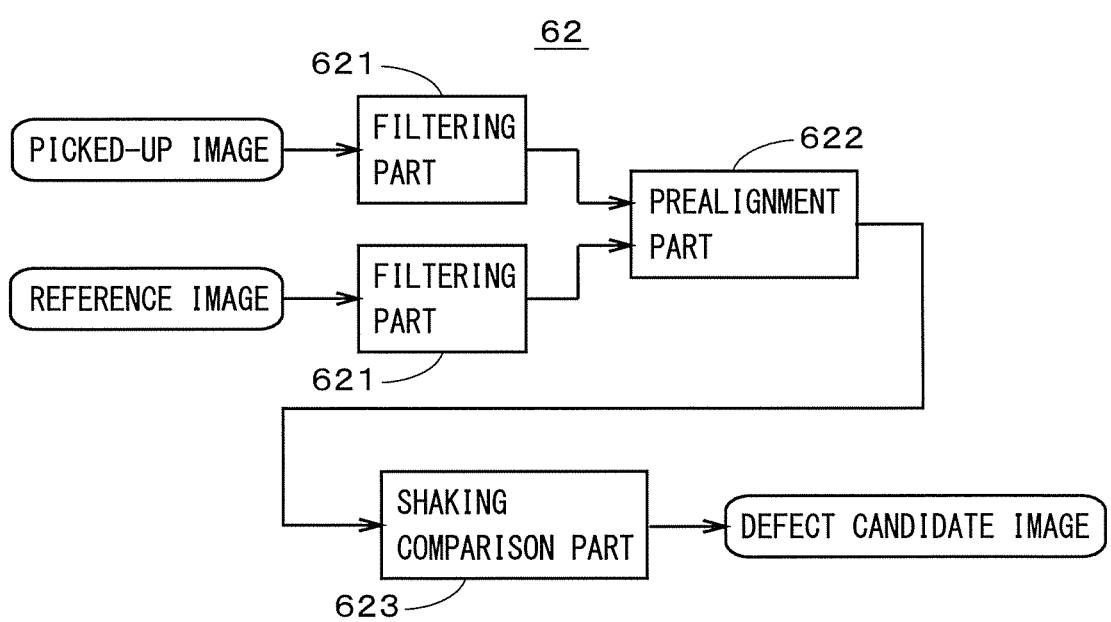
FIG. 9 is a view showing a constitution of a defect candidate detection part.

FIG. 9 is a view showing a constitution of the defect candidate detection part 62. In the defect candidate detection part 62, stored in advance are a first reference image corresponding to each first picked-up image and a second reference image corresponding to the second picked-up image. Herein, the first reference image corresponding to each first picked-up image is an image acquired under the same condition as that of the first picked-up image, indicating the object area which does not include any defect. The first reference image is acquired, for example, by performing the same process as that of above-described Step S14 on an object with no defect, and stored into the defect candidate detection part 62. The first reference image corresponding to each first picked-up image may be generated by performing a predetermined process on the first picked-up image. The same applies to the second reference image corresponding to the second picked-up image. Since the same process is performed on the plurality of first picked-up images and the second picked-up image in the defect candidate detection part 62, in the following description, each of the plurality of first picked-up images and the second picked-up image is referred to simply as a "picked-up image" and the first reference image or the second reference image corresponding to the picked-up image is referred to simply as a "reference image".

In two filtering parts 621, a filtering process for removing noises, using a median filter, a Gaussian filter, or the like, is performed on the picked-up image and the reference image, and the picked-up image and the reference image after being subjected to the filtering process are inputted to a prealignment part 622. In the prealignment part 622, a relative position and the amount of deviation in angle of the picked-up image with respect to the reference image (after being subjected to the filtering process) are specified by pattern matching using a predetermined pattern. Then, by parallelly moving and rotating the picked-up image with respect to the reference image by the amounts of deviation in position and angle between these images, the position and angle of the picked-up image can be aligned with those of the reference image (in other words, a prealignment is performed).

In a shaking comparison part 623, in an operation of moving the picked-up image from the position after the prealignment with respect to the reference image to each of a plurality of positions in two-dimensional arrangement, obtained is an evaluation value indicating the difference between the picked-up image after being moved and the reference image (for example, a sum of the differences (absolute values) in pixel values in an area in which these images overlap each other). Then, an image representing the differences (absolute values) in the pixel values of these images at a position where the evaluation value becomes minimum is binarized with a predetermined threshold value, and a binary defect candidate image is outputted. Thus, in the defect candidate detection part 62, by comparing each picked-up image with the reference image corresponding to the picked-up image, generated is a defect candidate image representing an area of defect candidate (hereinafter, referred to as a "defect candidate area") in the object area. In other words, the defect candidate area in the object area is detected on the basis of the picked-up image.

The above process is performed on all the plurality of first picked-up images and the second picked-up image. As described above, in the defect candidate detection part 62, by comparing each first picked-up image with the first reference image corresponding to the first picked-up image, a first defect candidate image representing a first defect candidate area is generated and the first defect candidate area is detected (Step S16). Further, by comparing the second picked-up image with the second reference image corresponding to the second picked-up image, a second defect candidate image representing a second defect candidate area is generated and the second defect candidate area is detected (Step S17). Assuming that the first defect candidate image acquired from the first picked-up image by lighting at N degrees is referred to as a "first defect candidate image by lighting at N degrees", in above-described Step S16, a first defect candidate image by lighting at −90 degrees, a first defect candidate image by lighting at −45 degrees, a first defect candidate image by lighting at 0 degrees, a first defect candidate image by lighting at +45 degrees, and a first defect candidate image by lighting at +90 degrees are acquired.

Figure 10:
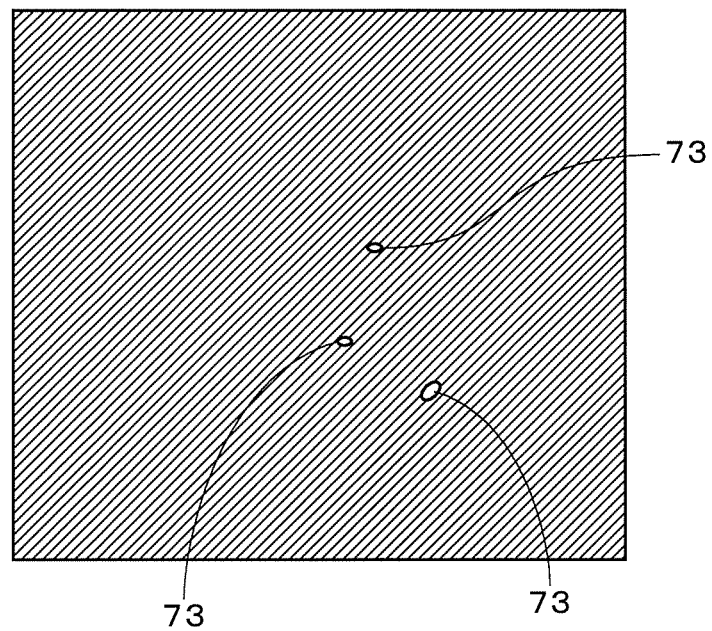
FIG. 10 is a view showing a first defect candidate image.
Figure 11:
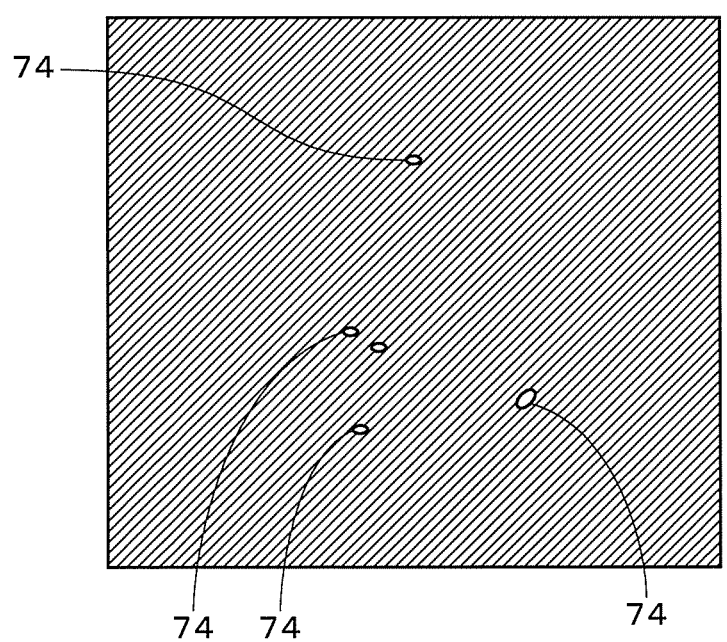
FIG. 11 is a view showing a second defect candidate image.

FIG. 10 is a view showing the first defect candidate image by lighting at −45 degrees obtained from the first picked-up image of FIG. 6, and FIG. 11 is a view showing the second defect candidate image by all lightings at −90 degrees, −45 degrees, 0 degrees, +45 degrees, and +90 degrees, obtained from the second picked-up image of FIG. 8. The first defect candidate image of FIG. 10 is a binary image representing the true defect area 71 and the false defect areas 72 shown in FIG. 6 as the first defect candidate areas 73. The second defect candidate image of FIG. 11 is a binary image representing the true defect area 71 and the false defect areas 72 shown in FIG. 8 as the second defect candidate areas 74. The plurality of first defect candidate images and the second defect candidate image are outputted to the defect specifying part 63.

Figure 12:
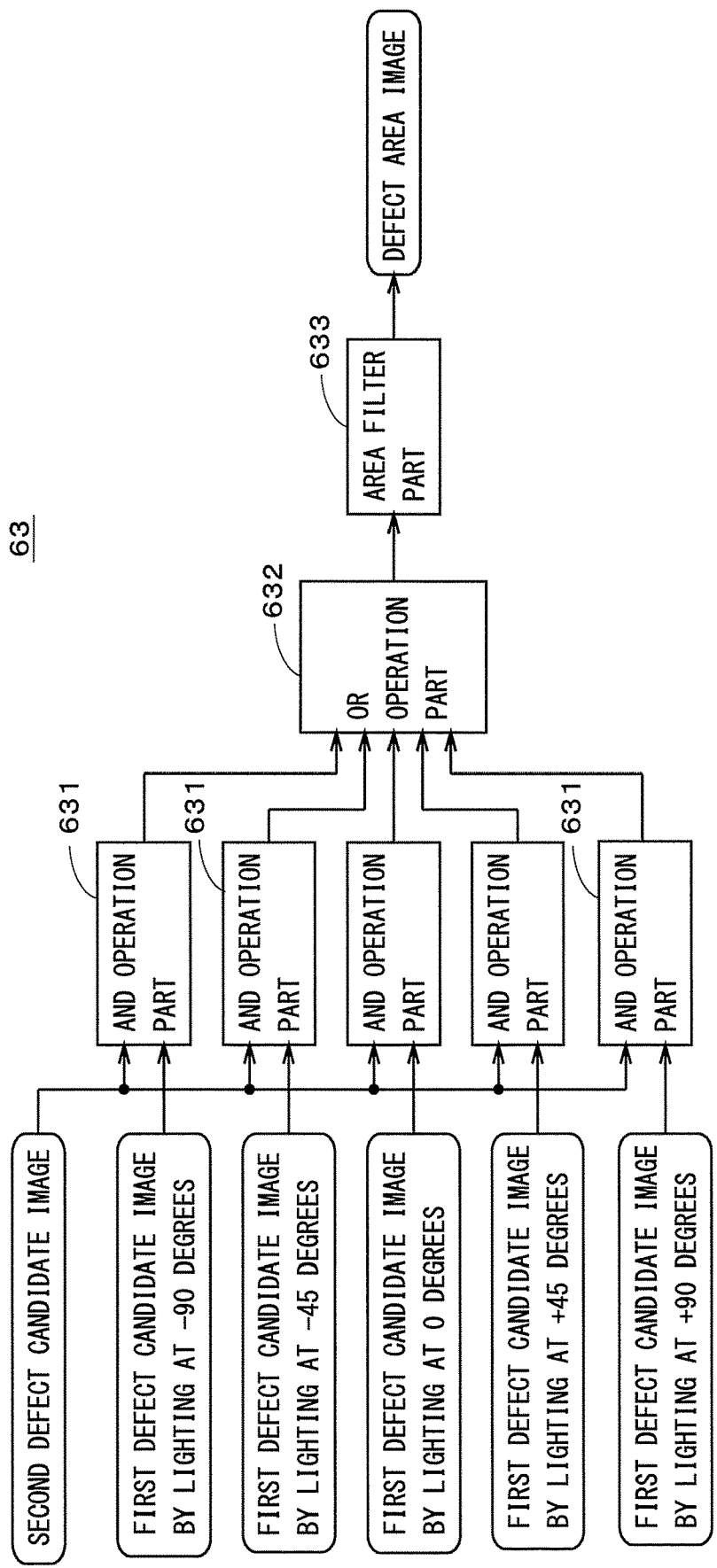
FIG. 12 is a view showing a constitution of a defect specifying part.

FIG. 12 is a view showing a constitution of the defect specifying part 63. Into a plurality of AND operation parts 631, pixel values of the respective first defect candidate images by lightings at −90 degrees, −45 degrees, 0 degrees, +45 degrees, and +90 degrees are sequentially inputted. Further, into the plurality of AND operation parts 631, pixel values of the second defect candidate image are sequentially inputted. Then, in each of the AND operation parts 631, a logical product of a value of each pixel of the second defect candidate image and a value of the corresponding pixel of the first defect candidate image is obtained and outputted to an OR operation part 632. Therefore, in each AND operation part 631, when the second defect candidate image and the first defect candidate image are accurately overlaid on each other, a value indicating the defect area is outputted for the pixel in an area where the second defect candidate area 74 and the first defect candidate area 73 overlap each other. Further, a value indicating a non-defect area is outputted for the pixel in an area where the second defect candidate area 74 and the first defect candidate area 73 do not overlap each other. Thus, an overlapping area in the second defect candidate area 74 and the first defect candidate area 73 is substantially specified as the defect area in the object area.

Figure 13:
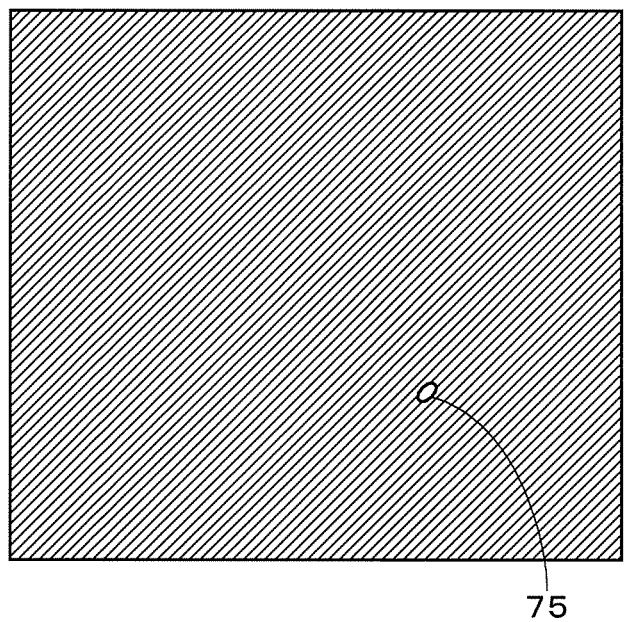
FIG. 13 is a view showing a defect area image.

In the OR operation part 632, a logical sum of the values inputted from the plurality of AND operation parts 631 for each pixel of the second defect candidate image is obtained and outputted to an area filter part 633. Specifically, when the value indicating the defect area is inputted for each pixel of the second defect candidate image from any one of the AND operation parts 631, the value indicating the defect area is outputted to the area filter part 633, and when the values indicating the non-defect area are inputted for each pixel of the second defect candidate image from all the AND operation parts 631, the value indicating the non-defect area is outputted to the area filter part 633. In the area filter part 633, generated is an image in which the value inputted from the OR operation part 632 for each pixel of the second defect candidate image is set as a value of the position of the pixel. Then, in the image, a set of successive pixels each having the value indicating the defect area is specified as the defect area, and when the area of the defect area is smaller than a predetermined area threshold value, the values of the pixels included in the defect area are changed to the values indicating the non-defect area. The values of the pixels in the defect area having the area not smaller than the area threshold value are not changed. As shown in FIG. 13, a defect area image representing a final defect area 75 is thereby acquired for the object area of the target image pickup part 32 (Step S18). The position of the final defect area 75 coincides with that of the true defect area 71 shown in FIGS. 6 and 8.

The control part 60 checks if all the selected image pickup parts are specified as the target image pickup part. Herein, since there are some selected image pickup parts which are not specified as the target image pickup part (Step S19), one of the other oblique image pickup parts 32 is specified as the target image pickup part (Step S13). As described earlier, when the main body 11 is viewed from above with a downward line of sight (see FIG. 2), since the four oblique image pickup parts 32 are arranged circumferentially at an angular interval of 90 degrees, an area of the object 9 for which any defect area image is not acquired becomes the object area corresponding to the target image pickup part 32.

After the target image pickup part 32 is specified, like in the above-described case, five first picked-up images are acquired for the object area by lightings at −90 degrees, −45 degrees, 0 degrees, +45 degrees, and +90 degrees (Step S14), and subsequently, the second picked-up image by all lightings at −90 degrees, −45 degrees, 0 degrees, +45 degrees, and +90 degrees is acquired (Step S15). The first defect candidate image is generated by comparing each first picked-up image with the first reference image corresponding to the first picked-up image (Step S16), and the second defect candidate image is generated by comparing the second picked-up image with the second reference image corresponding to the second picked-up image (Step S17). Then, from each first defect candidate image and the second defect candidate image, the defect area image for the object area is acquired (Step S18).

In the inspection apparatus 1, by using all the selected image pickup parts as the target image pickup part, the above process for acquiring the defect area image is performed (Step S19). The defect area image is thereby acquired for each of the four object areas arranged on the object 9 circumferentially at an angular interval of 90 degrees.

Subsequently, the control part 60 checks if the stage 2 has been rotated at predetermined times. Herein, since the stage 2 has not been rotated (Step S20), the stage rotation part 21 rotates the stage 2 about the central axis J1 by 45 degrees (Step S21). In each combination of circumferentially adjacent two object areas among the above-described four object areas, an area between the two object areas is thereby caused to face one of the oblique image pickup parts 32. Then, like in the above-described case, Steps S13 to S18 are repeated (Step S19). As a result, the defect area image is acquired for each of eight object areas arranged on the object 9 circumferentially at an angular interval of 45 degrees. Since the eight object areas are successively arranged circumferentially along the entire circumference, the defects of the object 9 are detected circumferentially along the entire circumference. The eight object areas may partially overlap one another. The control part 60 confirms that the stage 2 has been rotated at the predetermined times, and the inspection of the object 9 is completed (Step S20).

Though the case has been described where the four oblique image pickup parts 32 are specified as the selected image pickup parts and the oblique light source parts 42 placed at the angular positions of −90 degrees, −45 degrees, 0 degrees, +45 degrees, and +90 degrees with respect to each of the oblique image pickup parts 32 which are the selected image pickup parts are used as the specific light source part group in the above-described exemplary process, other combinations of the selected image pickup parts and the specific light source part group may be used. For example, there may be another case where the four side image pickup parts 33 are specified as the selected image pickup parts and the side light source parts 43 placed at the angular positions of −90 degrees, −45 degrees, 0 degrees, +45 degrees, and +90 degrees with respect to each of the side image pickup parts 33 which are the selected image pickup parts are used as the specific light source part group. Further, a plurality of side light source parts 43 may be used as the specific light source part group with respect to the oblique image pickup part 32 which is the selected image pickup part, and a plurality of oblique light source parts 42 may be used as the specific light source part group with respect to the side image pickup part 33 which is the selected image pickup part.

Furthermore, the upper image pickup part 31 may be specified as the selected image pickup part, and the upper light source part 41 may be used as one included in the specific light source part group. Depending on the type of the object 9, only the light source parts placed at the angular positions of −45 degrees, 0 degrees, and +45 degrees with respect to the selected image pickup part may be used as the specific light source part group. The specific light source part group may include the upper light source part 41, the oblique light source parts 42, and the side light source parts 43. It is preferable that the number of light source parts used as the specific light source part group with respect to each selected image pickup part should be not less than 3 (e.g., not more than 5). In the inspection apparatus 1, by specifying various image pickup parts as the selected image pickup parts and using a plurality of various light source parts as the specific light source part group with respect to each selected image pickup part, a defect detection can be performed with high accuracy.

As described above, in the inspection apparatus 1, a plurality of light source parts for irradiating an object area facing an image pickup part with light from a plurality of directions are provided, the first picked-up image is acquired in the image pickup part by light irradiation from one of the plurality of light source parts, and the second picked-up image is acquired in the image pickup part by light irradiation from the plurality of light source parts. Further, the first defect candidate area is detected by comparing the first picked-up image with the first reference image corresponding to the first picked-up image, and the second defect candidate area is detected by comparing the second picked-up image with the second reference image corresponding to the second picked-up image. Then, an overlapping area in the first defect candidate area and the second defect candidate area is specified as a defect area in the object area. It is thereby possible to appropriately remove a false defect area in the first and second defect candidate areas, which is caused by the microscopic projections and depressions on the satin-finished surface of the object 9, and to detect a defect (true defect) on the surface of the object 9 with high accuracy.

Further, in the inspection of the object 9, by sequentially using the plurality of light source parts, a plurality of first picked-up images are acquired in the image pickup part. By comparing the plurality of first picked-up images with the plurality of first reference images corresponding to the plurality of first picked-up images, respectively, a plurality of first defect candidate images each representing the first defect candidate area are generated. Then, an overlapping area in the first defect candidate area represented by each first defect candidate image and the second defect candidate area is specified as a defect area in the object area. Thus, since the plurality of first picked-up images are acquired by using the plurality of light source parts with respect to one object area (an image pickup position of one image pickup part) and the defect area in the object area is detected on the basis of the plurality of first picked-up images, it is possible to detect a defect on the surface of the object 9 more stably (more reliably).

In the inspection apparatus 1, since the upper image pickup part 31, the plurality of oblique image pickup parts 32, and the plurality of side image pickup parts 33 are provided, it is possible to reduce blind spots of the object 9 and to increase the reliability of the inspection on the object 9.

In the inspection apparatus 1, various modifications can be made.

In the inspection apparatus 1, eight oblique image pickup parts 32 may be provided at the same positions as those of the eight oblique light source parts 42, and eight side image pickup parts 33 may be provided at the same positions as those of the eight side light source parts 43. In this case, while the rotation of the stage 2 is omitted in Step S21 of FIG. 4, it is possible to detect a defect of the object 9 circumferentially along the entire circumference in a short time. Further, in order to reduce the manufacturing cost of the inspection apparatus 1, two oblique image pickup parts 32 and two side image pickup parts 33 are omitted in FIG. 2. In this case, the remaining two oblique image pickup parts 32 are provided circumferentially at an angular interval of 180 degrees, and the remaining two side image pickup parts 33 are provided circumferentially at an angular interval of 180 degrees. Further, the number of rotations of the stage 2 in Step S20 is set to three.

In order to further reduce the manufacturing cost of the inspection apparatus 1, there may be a case where one upper image pickup part 31, one oblique image pickup part 32, and one side image pickup part 33 are only provided in the image pickup unit 3 and one upper light source part 41, five oblique light source parts 42, and five side light source parts 43 are only provided in the light source unit 4. The five oblique light source parts 42 are placed at the angular positions of −90 degrees, −45 degrees, 0 degrees, +45 degrees, and +90 degrees with respect to the oblique image pickup part 32, and the five side light source parts 43 are placed at the angular positions of −90 degrees, −45 degrees, 0 degrees, +45 degrees, and +90 degrees with respect to the side image pickup part 33. In this case, the number of rotations of the stage 2 in Step S20 is set to seven.

In the inspection apparatus 1, there may be a case where the stage 2 is fixed and the image pickup unit 3 and the light source unit 4 are rotated about the central axis J1. Further, a central axis J1 oriented in any direction other than the vertical direction (direction of gravity) may be set.

Depending on the type of the object 9, only one of the first defect candidate image and the second defect candidate image may be generated with respect to a selected image pickup part, and a defect candidate area represented by the defect candidate image may be dealt as the defect area.

Figure 14:
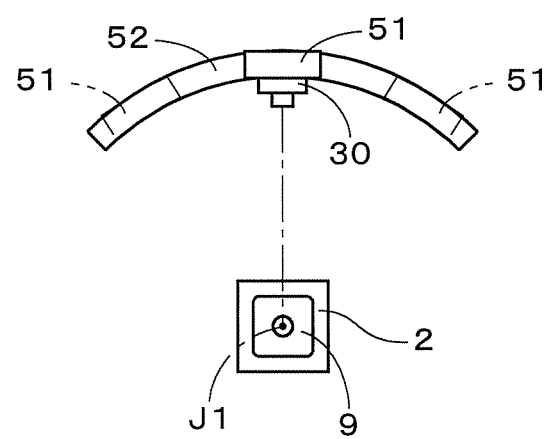
FIG. 14 is a view showing another example of the inspection apparatus.

Though the plurality of light source parts for irradiating the object area with light from a plurality of directions are provided as the second lighting part and one of the plurality of light source parts is dealt as the first lighting part in the above-described inspection apparatus 1, the first lighting part 51 and the second lighting part 52 may be separately provided, as shown in FIG. 14. The first lighting part 51 can irradiate the object area on the surface of the object 9 with light from only one direction and the second lighting part 52 can irradiate the object area with light from a plurality of directions. In the exemplary configuration of FIG. 14, the first lighting part 51 is fixed onto an upper surface of the image pickup part 30 and the second lighting part 52 is fixed onto a lower surface of the image pickup part 30. In the second lighting part 52, a plurality of LEDs are arranged like an arc along the circumferential direction. In order to detect a defect more stably, it is preferable that a plurality of first lighting parts 51 for irradiating the object area with light from a plurality of different directions should be provided as indicated by a two-dot chain line of FIG. 14 and a plurality of first picked-up images representing the object area should be acquired by using the plurality of first lighting parts 51. Further, by omitting the first lighting part 51 and lighting only several LEDs successively provided in the second lighting part 52 as the first lighting part, it is also possible to irradiate the object area with light from only one direction. In this case, it can be regarded that a plurality of light source parts each of which is several LEDs successively provided are arranged circumferentially in the second lighting part 52.

The first lighting part 51 may be, for example, a part which irradiates the object area with light from a plurality of light sources which are slightly away (separated) from one another, only if the part irradiates the object area with light from substantially only one direction. From the viewpoint that an image pickup condition (a position where the false defect area occurs) is changed between the second picked-up image acquired by using the second lighting part and the first picked-up image acquired by using the first lighting part, it is preferable that lighting directions in which each position of the object area is irradiated with light by the second lighting part should include two directions away from each other by 45 degrees or more, and more preferably, the lighting directions should include two directions away from each other by 60 degrees or more.

Though the operation flow of FIG. 4 has been described, for easy understanding, assuming that the acquisition of the first picked-up image by one target image pickup part, the acquisition of the second picked-up image by the target image pickup part, the generation of the first defect candidate image from the first picked-up image, and the generation of the second defect candidate image from the second picked-up image are sequentially performed, for example, after the acquisition of the first picked-up image, the acquisition of the second picked-up image and the generation of the first defect candidate image may be performed concurrently. Further, the first picked-up images of a plurality of object areas may be sequentially acquired by a plurality of selected image pickup parts, and subsequently the second picked-up images of the plurality of object areas may be sequentially acquired. Thus, the operation flow of FIG. 4 can be changed as appropriate.

In the inspection apparatus 1, an inspection may be performed on a plate-like or film-like object having a satin-finished area on its surface. Though the inspection apparatus 1 is particularly suitable for the inspection of an object having, on its surface, a satin-finished area which is a metal surface, an appearance of an object having, on its surface, a satin-finished area which is a surface formed of a material other than a metal may be inspected by the inspection apparatus 1.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Inspection apparatus
9 Object
30 to 33 Image pickup part
41 to 43 Light source part
51 First lighting part
52 Second lighting part
60 Control part
62 Defect candidate detection part
63 Defect specifying part
73 First defect candidate area
74 Second defect candidate area
75 Defect area
S11 to S21 Step

The invention claimed is:

1. An inspection apparatus for inspecting an appearance of an object having a satin-finished area on its surface, comprising:
a stage on which an object is placed;
a plurality of light source parts disposed diagonally with respect to said stage and arranged circumferentially about a central axis of said stage at a predetermined angular interval so that said plurality of light source parts irradiate said object from respective directions;
an image pickup part for acquiring 1) a first picked-up image of a predetermined object area while irradiating said object area with light from only one direction using a first lighting part being one of said plurality of light source parts and 2) a second picked-up image of said object area while irradiating said object area with light from two or more directions using a second lighting part being two or more of said plurality of light source parts;
a defect candidate detection part for 1) detecting an area of a defect candidate in said object area as a first defect candidate area by comparing the first picked-up image acquired while irradiating said object area with the light from only one direction using said first lighting part, with a first reference image corresponding to said first picked-up image, and 2) detecting an area of a defect candidate in said object area as a second defect candidate area by comparing the second picked-up image acquired while irradiating said object area with the light from the two or more directions using said second lighting part, with a second reference image corresponding to said second picked-up image; and
a defect specifying part for specifying an overlapping area as a defect area in said object area, said overlapping area being an area where said first defect candidate area and said second defect candidate area overlap each other, an area where said first defect candidate area and said second defect candidate area do not overlap each other being specified as a non-defect area.

2. The inspection apparatus according to claim 1, further comprising:
a control part sequentially using each of the two or more of said plurality of light source parts of the second lighting part as said first lighting part, to cause said image pickup part to acquire a plurality of first picked-up images,
wherein said defect candidate detection part compares said plurality of first picked-up images with a plurality of first reference images corresponding to said plurality of first picked-up images, respectively, to generate a plurality of first defect candidate images each representing a first defect candidate area, and
said defect specifying part specifies an overlapping area in said first defect candidate area represented by each first defect candidate image and said second defect candidate area, as a defect area in said object area.

3. The inspection apparatus according to claim 2, wherein the number of said plurality of light source parts is not less than 3.

4. The inspection apparatus according to claim 1, wherein the number of said plurality of light source parts is not less than 3.

5. The inspection apparatus according to claim 1, wherein said plurality of light source parts are arranged circumferentially at an angular interval of 45 degrees.

6. The inspection apparatus according to claim 1, wherein said image pickup part includes a plurality of oblique image pickup parts disposed around said stage and arranged circumferentially about said central axis of said stage at a predetermined angular interval, and
said second picked-up image of an object area is acquired in each of said plurality of oblique image pickup parts while irradiating said object area with light from a plurality of different directions by light source parts included in said plurality of light source parts.

7. The inspection apparatus according to claim 1, wherein intensity of light emitted from each of the two or more of said plurality of light source parts of said second lighting part in acquiring said second picked-up image is lower than intensity of light emitted from said first lighting part in acquiring said first picked-up image.

8. An inspection method of inspecting an appearance of an object having a satin-finished area on its surface, the inspection method comprising:
a) acquiring, using an image pickup part, a first picked-up image of a predetermined object area on a surface of an object placed on a stage while irradiating said object area with light from only one direction using a first lighting part, the first lighting part being one of a plurality of light source parts, said plurality of light source parts disposed diagonally with respect to said stage and arranged circumferentially about a central axis of said stage at a predetermined angular interval so that said plurality of light source parts irradiate said object from respective directions;
b) acquiring, using the said image pickup part, a second picked-up image of the predetermined object area on the surface of the object placed on the stage while irradiating said object area with light from two or more directions using a second lighting part, the second lighting part being two or more of the plurality of light source parts;
c) detecting an area of a defect candidate in said object area as a first defect candidate area by comparing said first picked-up image with a first reference image corresponding to said first picked-up image;
d) detecting an area of a defect candidate in said object area as a second defect candidate area by comparing said second picked-up image with a second reference image corresponding to said second picked-up image; and
e) specifying an overlapping area as a defect area in said object area, said overlapping area being an area where said first defect candidate area and said second defect candidate area overlap each other, an area where said first defect candidate area and said second defect candidate area do not overlap each other being specified as a non-defect area.

9. The inspection method according to claim 8, wherein
a plurality of first picked-up images are acquired in said image pickup part by sequentially using each of the two or more of said plurality of light source parts of said second lighting part as said first lighting part in said operation a),
a plurality of first defect candidate images each representing a first defect candidate area are generated by comparing said plurality of first picked-up images with a plurality of first reference images corresponding to said plurality of first picked-up images, respectively, in said operation c), and
an overlapping area in said first defect candidate area represented by each first defect candidate image and said second defect candidate area is specified as a defect area in said object area in said operation e).

10. The inspection method according to claim 9, wherein the number of said plurality of light source parts is not less than 3.

11. The inspection method according to claim 8, wherein the number of said plurality of light source parts is not less than 3.

12. The inspection method according to claim 8, wherein said plurality of light source parts are arranged circumferentially at an angular interval of 45 degrees.

13. The inspection method according to claim 8, wherein said image pickup part includes a plurality of oblique image pickup parts disposed around said stage and arranged circumferentially about said central axis of said stage at a predetermined angular interval, and in said operation b), said second picked-up image of an object area is acquired in each of said plurality of oblique image pickup parts while irradiating said object area with light from a plurality of different directions by light source parts included in said plurality of light source parts.

14. The inspection method according to claim 8, wherein intensity of light emitted from each of the two or more of said plurality of light source parts of said second lighting part in acquiring said second picked-up image is lower than intensity of light emitted from said first lighting part in acquiring said first picked-up image.

* * * * *